Jan. 8, 1963
G. M. STEVENS
3,072,099
CUTTING GATE
Filed Dec. 1, 1960
3 Sheets-Sheet 1
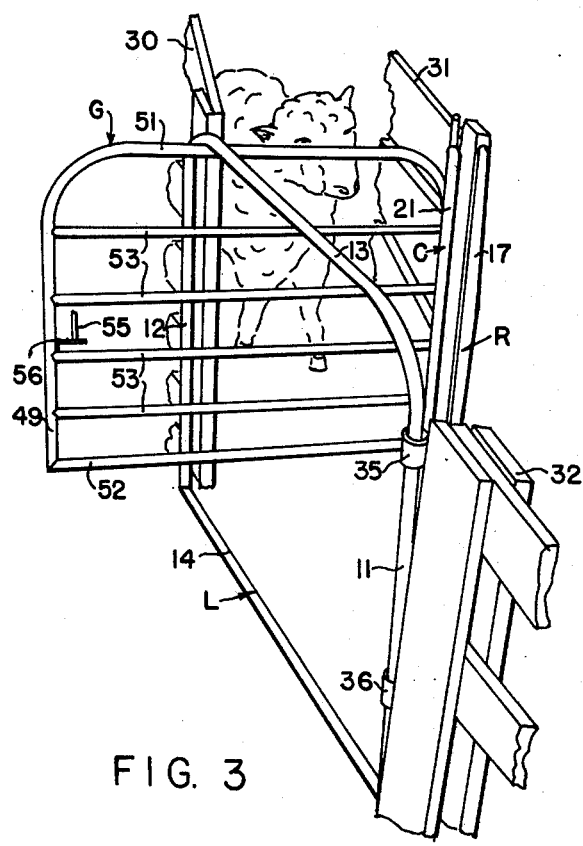
FIG. 1
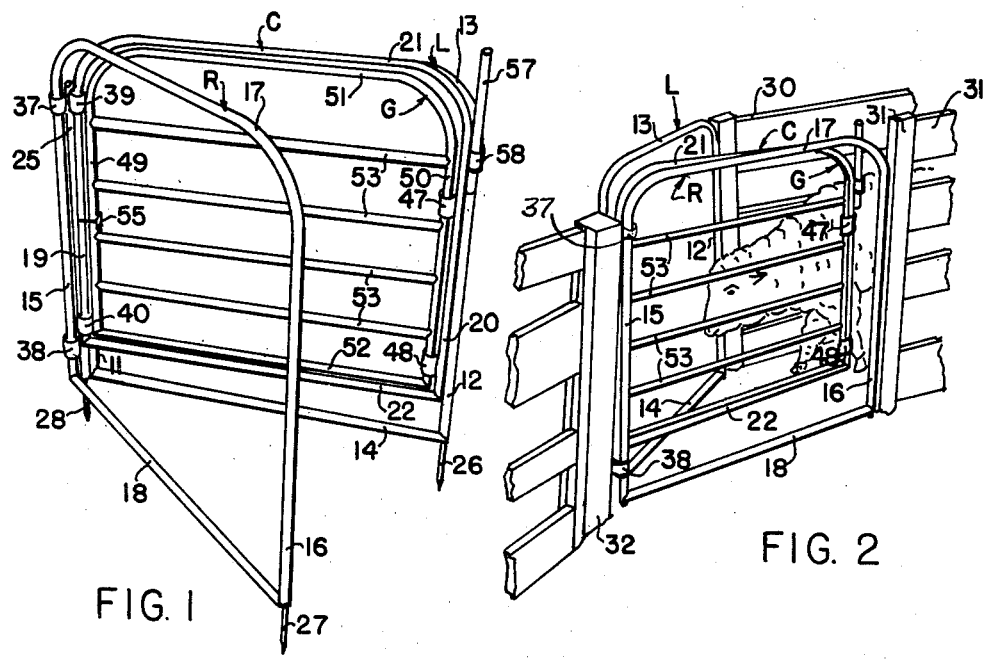
FIG. 2
FIG. 3
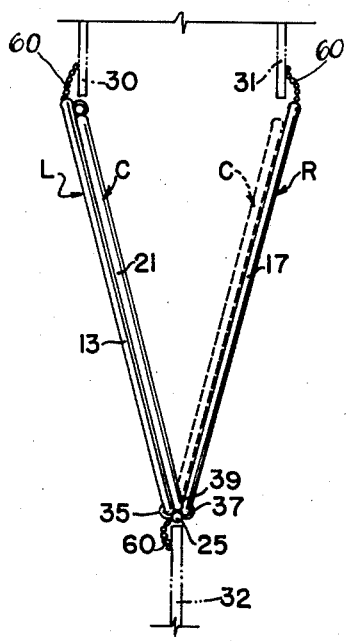
FIG. 4
INVENTOR.
GLENN M. STEVENS
BY
Horace B. Van Valkenburgh
ATTORNEY Jan. 8, 1963　　　G. M. STEVENS　　　3,072,099
CUTTING GATE Filed Dec. 1, 1960　　　　　　　　　　3 Sheets-Sheet 2

INVENTOR.
GLENN M. STEVENS
BY
Horace B. VanValkenburgh
ATTORNEY

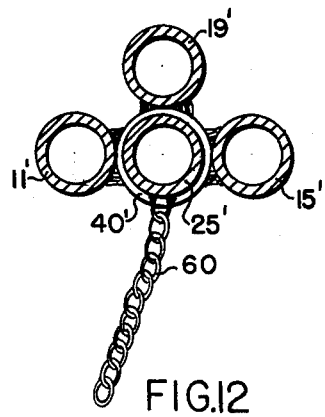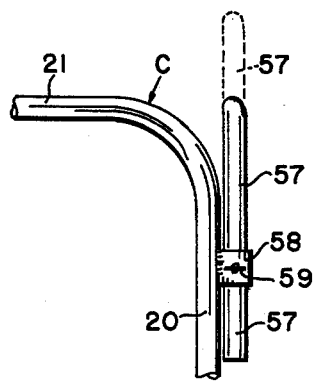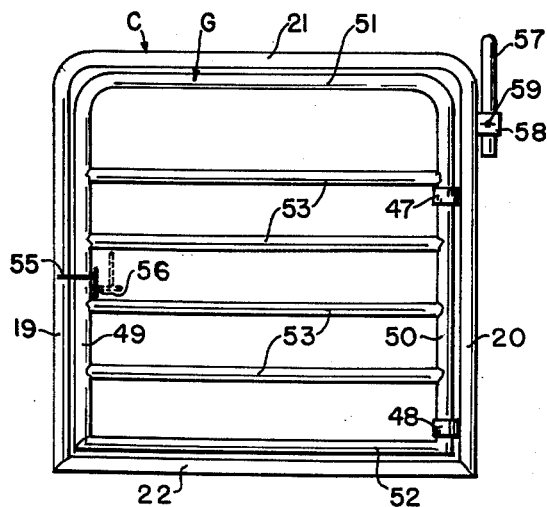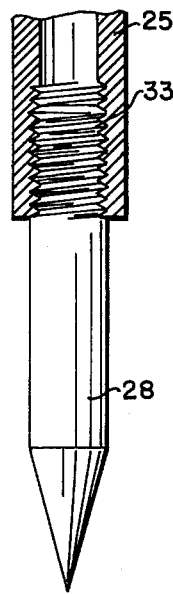

United States Patent Office 3,072,099
Patented Jan. 8, 1963

3,072,099
CUTTING GATE
Glenn M. Stevens, Grant, Nebr.
Filed Dec. 1, 1960, Ser. No. 72,919
13 Claims. (Cl. 119—155)

This invention relates to a cutting gate for sheep, hogs, and the like.

Cutting gates of various types and kinds are known, but most of these gates have been very heavy and bulky in construction and many are of a permanent type which cannot be moved readily from place to place. Thus, the need for a cutting gate of rugged construction, yet one which is light in weight and portable, has long existed.

Among the objects of this invention are to provide a novel cutting gate for sheep, hogs and the like; to provide such a cutting gate which is rugged and of light weight construction; to provide such a cutting gate which may be easily stored; to provide such a cutting gate which may be set up easily and quickly; to provide such a cutting gate which will cut to either side; to provide such a cutting gate which may be used to block off animals in a chute; and to provide such a cutting gate which will accommodate chutes of different widths.

Additional objects and the novel features of this invention will become apparent from the description which follows, taken in connection with the accompanying drawings, in which:

FIG. 1 is a perspective view of a cutting gate of this invention in spread position;

FIG. 2 is a perspective view of the cutting gate of FIG. 1 installed in a chute, showing a sheep being cut to one side;

FIG. 3 is a perspective view of the cutting gate of FIG. 1 installed in a chute, in blocking position;

FIG. 4 is a top plan view of the cutting gate of FIG. 1 installed in a chute indicated by dotted lines, with a center frame swung to the left in full position and swung to the right in dotted position;

FIG. 8 is an enlarged longitudinal section of the lower portion of an upright leg, showing particularly one form of removable stake, taken along line 8—8 of FIG. 6;

FIG. 9 is a side elevation of the center frame having an inner gate mounted thereon;

FIG. 10 is an enlarged side elevation of a handle and a portion of a center frame to which the handle is attached;

FIG. 12 is a fragmentary, enlarged cross section taken along line 11—11 of FIG. 11.

Figure 5:
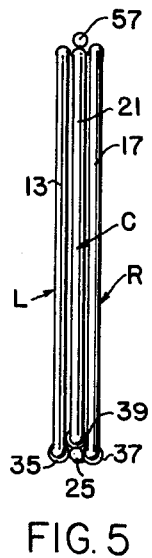
FIG. 5 is a top plan view of the cutting gate of FIG. 1 in knocked-down or storage position.

As may be seen in FIGS. 1–4 of the drawings, the cutting gate of the present invention comprises a left open frame L, a right open frame R and a center frame C. The left open frame L, through which an animal may step, comprises upstanding legs 11 and 12, connected at their upper ends by a curved top 13 and connected at their lower ends by a lower horizontal bar 14, while right open frame R similarly comprises upstanding legs 15 and 16, connected at their upper ends by a curved top 17 and connected at their lower ends by a lower horizontal bar 18. Center frame C comprises upstanding legs 19 and 20, connected at their upper ends by a curved top 21 and connected at their lower ends by a horizontal lower bar 22, frame C thus being open but is normally obstructed by an inner gate G. Left open frame L, right open frame R and center frame C are pivotaly attached to a post 25 along legs 11, 15 and 19, respectively, each of the frames and post being conveniently constructed of welded aluminum pipe or other suitable material, such as light weight steel tubing. For securing the cutting gate in position, the lower end of leg 12 of frame L is provided with a stake 26, the lower end of leg 16 of frame R with a stake 27 and the lower end of post 25 with a stake 28, the stakes being pushed into the ground to hold the frames L and R in open but fixed relation, such as abutting the ends of a chute having spaced parallel walls 30 and 31, as of fence construction. Also, post 25 is positioned abutting the end of a fence 32, which forms one wall of a pen into which animals are to be cut or separated, or a division between pens.

As will be evident, frames L and R are stationary during use, but frame C is swung from side to side, i.e., from frame L to frame R and vice versa, as in FIGS. 2 and 4, to direct the animal to the desired side. As will also be evident, the animal can step through either open frame L or open frame R over the lower bar 14 or 18 thereof, respectively, but not through frame C by virtue of inner gate G, which is pivoted in frame C on leg 20 and which is secured in position to close frame C during cutting, as in FIG. 2. It is noted that the clearance between lower bar 14 of frame L or lower bar 18 of frame R and lower bar 22 of frame C should be such that the rear legs of the animal should not be caught as the gate G is swung to closed position. Thus, to prevent catching the hocks of sheep, such clearance is conveniently about 6 inches. When the chute is to be blocked, as in FIG. 3, center frame C is swung to either side and inner gate G is swung across the end of the chute to prevent egress of the animals from the chute. The inner gate G is an important feature of the present invention, since during cutting operations, it is often desirable to suspend the same temporarily, which can readily be accomplished by swinging inner gate G across the end of the chute. Also, prior to beginning cutting operations, it is often desirable to block the chute, as shown in FIG. 3, until a number of animals have been driven into the chute.

Figure 6:
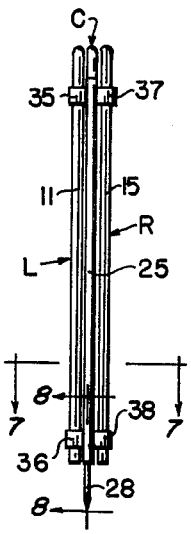
FIG. 6 is a rear view of the cutting gate in the position of FIG. 5.

In addition, with the inner gate G swung into the plane of center frame C and with frames L, R and C pivoted on post 25, the frames can be swung together in compact relation, as in FIGS. 5 and 6. Thus, the cutting gate of this invention can be readily stored and transported from one place of use to another. As seen in FIG. 8, the lower end of post 25 may be internally threaded to receive threads 33 at the upper end of stake 28 so that the stake may be easily removed for storage. It will be understood that stakes 26 and 27 may be similarly connected to upstanding legs 12 and 16 of open frames L and R, respectively, for easy removal. Of course, any other conventional connection, such as bayonet, slots at the lower end of the post and upstanding legs and mating pins on the stakes, may be used. The desirability of removal of stakes 26, 27 and 28 is occasioned by the fact that with the stakes attached, they are more likely to damage the finish of an automobile, for instance, in the trunk of which the cutting gate is particularly adapted to be stored for movement from one place to another, while the cutting gate is being placed in or removed from the trunk. Also, with the stakes removed, the cutting gate is more readily handled, i.e., without the projecting points of the stakes, and also requires less space for storage.

Figure 7:
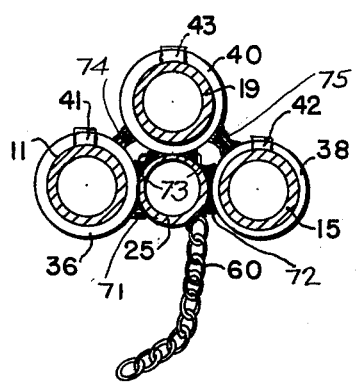
FIG. 7 is a fragmentary, enlarged cross section taken along line 7—7 of FIG. 6.

Pivoted attachment of frames L, R and C to post 25 may be accomplished by the use of three pairs of spaced bushings welded to the post 25 and each pair of which receives one of the upstanding legs of the frames, such as legs 11, 15 and 19, respectively. As in FIGS. 6 and 7, upper and lower bushings 35 and 36 for frame L are welded at 71 to one side of post 25; upper and lower bushings 37 and 38 for frame R are welded at 72 to the opposite side of post 25; and upper and lower bushings 39 and 40 for frame C are welded at 73 to the front of post 25, as also shown in FIG. 7. Bushings 39, 40, are also welded at 74 and 75 to bushings 35, 36 and 37, 38. Thus, upstanding leg 11 of the left open frame L is received in bushings 35 and 36 for pivotal movement of frame L; upstanding leg 15 of right open frame R is received in bushings 37 and 38 for pivotal movement of frame R; and upstanding leg 19 of the center open frame C is received in bushings 39 and 40 for pivotal movement of frame C. To prevent downward slippage of any of the frames on post 25, cap screws 41, 42 and 43 may be installed, just above the respective bushings 36, 38 and 40, so as to bear against the upper edge of the bushing, on the respective legs 11, 15 and 19 of the respective frame. As will be evident, each cap screw prevents the respective open frame from sliding downwardly until the center frame touches the ground or curved tops 13, 17 or 21 contact the upper bushings. Otherwise, unnecessary binding and friction would result, making the center frame difficult to swing and the left and right frames more difficult to handle during installation or transportation. Each cap screw may be attached to the respective leg by insertion in a threaded hole and, if desired, welded in place. It is understood, of course, that welds, or any other conventional type of projection, such as pins not shown, may be attached to the leg of the respective frame to prevent downward sliding of the respective frames on post 25, or the desired result accomplished in any other suitable manner.

Swinging inner gate G is pivotally attached to upstanding leg 20 of center open frame C in a suitable manner, as by bushings 47 and 48 of FIG. 9, which are conveniently welded to upstanding leg 20. Inner gate G comprises upstanding legs 49 and 50, connected at their upper ends by a curved top 51 and their lower ends by a lower horizontal bar 52, while a plurality of horizontal bars 53 extend between upstanding legs 49 and 50. Upstanding leg 50 is also received in bushings 47 and 48 for pivotal movement. A forked latch 55 is attached to upstanding leg 49 by means of pivot 56 and, as is evident from FIG. 9, the latch may be pivoted so that the fork extends on opposite sides of upstanding leg 19 of center frame C, thus preventing relative movement between the inner gate G and center frame C. The inner gate G, when locked against relative movement with respect to center frame C, may be swung together with frame C to one side, as viewed in FIG. 2, which allows the animals to be directed to the other side, or vice versa. Such an arrangement makes it possible to cut animals in either of two directions. The inner gate may be unlatched from the center frame C, by moving latch 55 to the position of FIG. 3, i.e., the dotted position of FIG. 9, so that, as in FIG. 3, the inner gate may be swung across the chute to block the animals from proceeding further.

A handle 57, as in FIG. 10, may be attached to leg 20 of the center frame C, near the upper end thereof, to provide means for easily swinging the center frame from a position adjacent left open frame L to a position adjacent right open frame R and vice versa. For this purpose, a bushing 58 is conveniently welded to the upper end of leg 20 and provided with a thumb screw 59, which may be tightened against handle 57 to hold it in place. This arrangement advantageously permits the handle to be extended upwardly when the cutting gate is in use, as to the dotted position of FIG. 10, but to be slid downwardly out of the way when the cutting gate is to be stored or not in use, so that handle 57 will extend no farther than top bar 21 of frame C.

When the gate is set up, post 25 may be secured to a fence post by means of a chain 60, shown in FIG. 7, the chain being wrapped around the fence post and securely fastened so that post 25 will be held tightly against the fence post. Normally, stakes 26 and 27, when pushed into the ground, will be sufficient to hold the opposite ends of frames L and R in position, although leg 12 of frame L and leg 16 of frame R may be secured to the posts at the end of the chute, as by chains, if desired.

Figure 11:
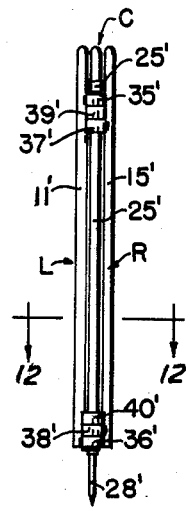
FIG. 11 is a rear view of an alternative cutting gate of this invention, in storage position.

In the alternative embodiment of this present invention, shown in FIGS. 11 and 12, one set of bushings is welded to center post 25' and one of the side frames, with the other two sets welded to the upstanding legs of the remaining frames. This arrangement may be found more convenient because it enables each frame to be made separately before connection to post 25', and also eliminates the necessity for set screws 41, 42 and 43 of FIG. 7 or similar means. Thus, upper and lower bushings 35' and 36' are welded both to upstanding leg 11' of left open frame L and to post 25', while upper and lower bushings 37' and 38' are welded to the upstanding leg 15' of right open frame R and upper and lower bushings 39' and 40' are welded to upstanding leg 19' of center frame C. By placing the fixed bushing 35' at the top of the upper set and the fixed bushing 36' at the bottom of the lower set, the right frame R and center frame C are prevented from slipping off post 25', as during handling or storage. Also, by placing bushings 39' and 40' for center frame C above bushings 37' and 38', respectively, the center frame is supported by both bushings and also is prevented from slipping downwardly on post 25', so that lower bar 22 thereof will not drag on the ground during use.

From the foregoing, it will be evident that a cutting gate constructed in accordance with this invention fulfills to a marked degree the requirements and objects hereinbefore set forth.

The cutting gate is sturdy and rugged when made of aluminum pipe welded together, but is light in weight. Removable stakes on the lower ends of the post and the front legs of the right and left frames, as well as a collapsible handle, facilitate storage. In knock-down position, the cutting gate is not substantially thicker than the total thickness of the three frames. The cutting gate may also be easily and quickly set up by one man, by placing the right and left frames in the desired position, then pushing the stakes into the ground by foot pressure on the lower bars of these frames. In this connection, it will be noted that the attachment of one frame to the post, in the embodiment of FIGS. 11 and 12, does not detract from the facility of set up or storage, since the freely pivotal open frame is readily swung to the desired position with the fixed open frame and post placed in the desired position thereof. For storage purposes, it is only necessary to move the three frames together in the first embodiment, or to move the center frame and pivotal open frame against the fixed open frame, in the second embodiment. When the inner gate is locked in place within the center frame, the center frame may be swung to a position adjacent either the left or right open frame, thus permitting passage of animals, such as sheep or hogs, to the opposite side for cutting purposes. When unlatched, the inner gate may be swung across the chute, when the center open frame is swung either to the left or right, thus blocking the animals in the chute.

Although a preferred embodiment of this invention has been illustrated and described, it will be understood that other embodiments may exist and various changes and variations may be made, without departing from the spirit and scope of this invention.

What is claimed is:

1. A cutting gate comprising a first open frame; a second open frame; means connecting said first and second open frames; a third open frame pivotally connected to said connection means for movement between said first and second open frames; and an inner gate pivotally connected to said third open frame.

2. A cutting gate comprising a first open frame having parallel upstanding legs; a second open frame having parallel upstanding legs, said open frames being of substantially equal size; pivot means interconnecting one of said upstanding legs of said first open frame with one of said upstanding legs of said second open frame; a third open frame having parallel upstanding legs, said third open frame having one of its upstanding legs attached to said pivot means for pivotal movement between said first and second open frames; an inner gate having parallel upstanding legs and being of substantially smaller size than said third open frame so that it may be swung through said first, second and third open frames, respectively; and second pivot means pivotally interconnecting one of said upstanding legs of said inner gate with the other of said upstanding legs of said third frame.

3. A cutting gate as defined in claim 2, in which said inner gate has at least one cross member extending between said parallel upstanding legs.

4. A cutting gate as defined in claim 2, in which the other of said two upstanding legs of said first and second open frame members is each provided with a removable stake at the lower end thereof.

5. A cutting gate comprising a first open frame; a second open frame, each of said open frames having first and second upstanding legs, said first upstanding leg of said first open frame being connected to said first upstanding leg of said second open frame through an interconnection so that the first and second open frames may be disposed in angular relationship; a third open frame having first and second upstanding legs, said first upstanding leg of said third open frame being pivotally connected to said interconnection between said first and second open frames, said third open frame having pivotal means to prevent the passage of animals therethrough.

6. A cutting gate as defined in claim 5, in which said pivotal means comprises an inner gate of substantially smaller size than said third open frame and having first and second upstanding legs; means pivotally connecting said first upstanding leg of said gate with said second upstanding leg of said third open frame, said gate having a plurality of cross members to prevent passage of animals through said gate and being adapted to be swung to a position in the plane of said third open frame as well as to a position intersecting the plane of either said first or second open frames.

7. A cutting gate as defined in claim 6, in which said angular relationship of said first and second open frames defines an acute angle and said pivot means is attached to said interconnection within said acute angle.

8. A cutting gate as defined in claim 5, including a handle attached to said second upstanding leg of said third open frame for swinging said third frame from a position adjacent said first open frame to a position adjacent said second open frame, said handle being adjustable to an upper position for use and a lower position for storage.

9. A cutting gate according to claim 5, in which said second upstanding leg of each of said first and second open frames is provided at its lower end with a removable stake; and said interconnection includes an upright post provided with a removable stake at its lower end.

10. A cutting gate according to claim 6, in which said inner gate is provided with a latch for optionally preventing movement of said inner gate relative to said third open frame.

11. A cutting gate comprising left and right and center open frames each having spaced upstanding legs, an upper bar and a lower bar extending between the upper and lower ends, respectively, of said legs; an upright post; means connecting one of said upstanding legs of each said frame to said post, said means providing a pivotal connection between said post and a first leg of said center frame and also between said post and a first legt of at least one of said right and left frames; an inner gate within said center frame and pivotally connected at one side to the opposite leg of said center frame; and latch means for removably securing the opposite side of said gate to said first leg of said center frame.

12. A cutting gate as defined in claim 11, wherein said connecting means comprises upper and lower bushings for each said frame, said bushings being joined by a weld to said post and first leg of the corresponding frame extending through the corresponding bushings.

13. A cutting gate as defined in claim 11, wherein said connecting means comprises upper and lower bushings for each said frame and encircling said posts; said bushings for said center frame being joined by a weld to said first leg thereof and pivotal on said post; said bushing for one of said left and right frames being welded to said first leg of said frame, pivotal on said post and disposed beneath the respective bushings for said center frame; and said bushings for the other of said right and left frames being welded both to said post and to said first leg of said frame, the upper of said bushings being the uppermost bushing and the lower of said bushings being the lowermost bushing.

References Cited in the file of this patent
UNITED STATES PATENTS

| | | |
|---|---|---|
| 2,504,214 | Miller et al. | Apr. 18, 1950 |
| 2,690,326 | Kranick | Sept. 28, 1954 |
| 2,773,476 | Thomas | Dec. 11, 1956 |
| 2,851,993 | Hettinger | Sept. 16, 1958 |